(12) United States Patent
Wawrzola et al.

(10) Patent No.: US 11,512,810 B2
(45) Date of Patent: Nov. 29, 2022

(54) AUTOMATIC LUBRICATOR FOR LUBRICATING AN OBJECT

(71) Applicant: Dodge Industrial, Inc., Oxford, CT (US)

(72) Inventors: Grzegorz Wawrzola, Kielce (PL);
Daniel Lewandowski, Cracow (PL);
Eric Lambert, Central, SC (US); Piotr Ryba, Humniska (PL); Greg Hewitt, Taylors, SC (US); Artur Rdzanek, Simpsonville, SC (US)

(73) Assignee: Dodge Industrial, Inc., Oxford, CT (US)

( * ) Notice: Subject to any disclaimer, the term of this patent is extended or adjusted under 35 U.S.C. 154(b) by 370 days.

(21) Appl. No.: 16/593,522

(22) Filed: Oct. 4, 2019

(65) Prior Publication Data

US 2021/0102664 A1 Apr. 8, 2021

(51) Int. Cl.
*F16N 11/10* (2006.01)
*F16N 11/08* (2006.01)
*F01M 11/10* (2006.01)

(52) U.S. Cl.
CPC ............. *F16N 11/08* (2013.01); *F01M 11/10* (2013.01); *F16N 2250/18* (2013.01)

(58) Field of Classification Search
CPC ................................ F16N 11/08; F16K 31/046
See application file for complete search history.

(56) References Cited

U.S. PATENT DOCUMENTS

| 5,634,531 | A | 6/1997 | Graf et al. |
| 6,125,969 | A | 10/2000 | Graf et al. |
| 6,216,822 | B1 | 4/2001 | May et al. |
| 9,261,204 | B2 * | 2/2016 | Scott ..................... F16K 31/046 |
| 2004/0099483 | A1 | 5/2004 | Song |
| 2010/0134064 | A1 | 6/2010 | Heikkila |

OTHER PUBLICATIONS

International Searching Authority / US, International Search Report & Written Opinion issued in corresponding Application No. PCT/US2020.053957, dated Jan. 5, 2021, 9 pp.

* cited by examiner

*Primary Examiner* — Charles A Fox
(74) *Attorney, Agent, or Firm* — Robinson & Cole LLP

(57) ABSTRACT

An automatic lubricator for lubricating an object comprises a housing with a coupling section configured to couple with a lubricant container containing a lubricant. The lubricant container comprises a rotatable shaft with a piston to dispense the lubricant from an output of the lubricant container. The lubricator further comprises an electric motor configured to drive the rotatable shaft of the lubricant container during at least one lubrication action, such that at least a part of the lubricant is dispensable from the lubricant container during the at least one lubrication action, and a control circuitry for controlling the electric motor. The control circuitry is configured to determine a back electromotive force (BEMF) generated by the electric motor during at least a part of the at least one lubrication action, and to determine, based on the determined BEMF, at least one lubrication parameter indicative of the at least one lubrication action.

25 Claims, 2 Drawing Sheets

AUTOMATIC LUBRICATOR FOR LUBRICATING AN OBJECT

TECHNICAL FIELD

The present invention relates to an automatic lubricator and/or lubrication device for lubricating an object. The invention further relates to a lubrication system comprising such lubricator, a method of lubricating an object, a computer program, and a non-transitory computer-readable medium storing such computer program.

TECHNICAL BACKGROUND

Automatic lubricators, lubrication devices and/or lubrication systems are usually used for ensuring a smooth and reliable operation of an apparatus, engine, device and/or industrial system by lubricating one or more objects, parts, portions and/or members thereof. Such objects, parts, portions and/or members can, for example, be and/or comprise a bearing, a shaft or the like.

Generally, an automatic lubricator can automatically apply lubricant onto and/or into the object that should be lubricated at a specified lubrication time, with a certain lubrication frequency and/or in certain lubrication time intervals. This can render a manual application of the lubricant unnecessary and hence allow to reduce maintenance effort and costs. Therein, a selection of an appropriate lubricant and/or time of lubrication can prevent a failure of the object, the apparatus, engine, device and/or the industrial system, thereby allowing to extend the lifetime thereof.

SUMMARY

According to the present disclosure, there is provided an improved lubricator that provides improved and/or enhanced functionality, e.g. in terms of reliably, quickly, efficiently and/or accurately determining one or more lubrication parameters.

This is achieved by the subject matter of the independent claims, wherein further embodiments are incorporated in the dependent claims, the following description and the appended figures.

According to a first aspect of the present disclosure, an automatic and/or at least partly automated lubricator configured to lubricate an object is provided. Generally, the lubricator may refer to a lubrication device configured to apply lubricant onto and/or into at least a part of the object. The lubricator comprises a housing with a coupling section and/or coupling portion configured to couple with a lubricant container for containing and/or containing a lubricant. The lubricant container comprises a rotatable shaft with a piston arranged thereon to dispense the lubricant from an output and/or outlet of the lubricant container. The lubricator further comprises an electric motor configured to drive the rotatable shaft of the lubricant container during at least one lubrication action, such that at least a part of the lubricant is dispensable, can be dispensed and/or is dispensed from the lubricant container during the at least one lubrication action. The lubricator further comprises a control circuitry for actuating and/or controlling the electric motor, wherein the control circuitry is configured to determine, detect, measure and/or monitor a back electromotive force generated by the electric motor during at least a part of the at least one lubrication action. The back electromotive force is also referred to as "BEMF" hereinafter. Moreover, the control circuitry is configured to determine, based on the determined BEMF, at least one lubrication parameter indicative, representative, and/or descriptive of the at least one lubrication action. Alternatively or additionally, the control circuitry may be configured to derive, calculate and/or compute the at least one lubrication parameter based on (and/or from) the determined BEMF.

As will be further discussed in the following, determining the BEMF of the electric motor during at least a part of the lubrication action can advantageously allow for a reliable, accurate and efficient determination of one or more lubrication parameters. Further, the determination of the BEMF may not require substantial modifications to existing lubricators, such as e.g. one or more dedicated sensors for determining the one or more lubrication parameters. In turn, this may allow manufacturing the lubricator in a cost-efficient manner.

Here and in the following, the "object" can refer to any part, portion and/or member that should be lubricated. For instance, the object can refer to a movable part of an apparatus, device, system and/or industrial system, such as e.g. a motor, an engine or the like. Such a movable part can, for example, be a bearing, a shaft, a drive shaft or the like.

The coupling section of the housing can be configured for being coupled to the lubricant container or at least a part thereof. For instance, the coupling section of the housing can be configured for being detachably attached and/or mechanically coupled to the lubricant container. Alternatively or additionally, the coupling section can be configured for engaging with at least a part of the lubricant container. The lubricant container and the coupling section may, for instance, be coupled via a threaded coupling or any other suitable coupling allowing to attach and/or detach the container to the housing.

The lubricant container can refer to any type of container, cartridge, can and/or tank configured to store and/or contain a lubricant. The rotatable shaft of the container can, for example, refer to a rotatable screw. The piston of the container can be displaceably arranged on, attached to and/or mounted to the rotatable shaft of the lubricant container. By rotation of the rotatable shaft, the piston can be moved and/or displaced along the rotatable shaft, e.g. in direction towards the output and/or outlet of the container, such that lubricant can at least partly be pushed and/or moved by the piston out of the output of the container to lubricate the object.

The electric motor can be an arbitrary type of electric motor, such as e.g. a DC motor, an AC motor, a brushed motor or a brushless motor. The electric motor can be supplied with electrical power by a power supply of the lubricator. The power supply can be connected to a supply grid or it can comprise one or more batteries and/or accumulators.

In the context of the present disclosure the term "lubrication action" may refer to a state of the lubricator, in which the electric motor is actuated by the control circuitry, supplied with electrical power, powered and/or driven by electrical power. Accordingly, the lubrication action may refer to and/or be indicative of a time period and/or a lubrication time period, during which the electric motor is actuated by the control circuitry, supplied with electrical power, powered and/or driven with electrical power by the control circuitry (and/or the power supply). During the lubrication action, a certain amount of lubricant may be dispensed by the lubricator. Depending on a condition or state of the lubricant container, such as e.g. a blockage of the output, however, dispensing of lubricant may be blocked, although the electric motor is actuated and/or powered. Accordingly, the term "lubrication action" can be accompanied by and/or result in dispensing a certain amount of lubricant or it can be accompanied by and/or result in powering the electric motor without dispensing lubricant, e.g. in the case of a blockage of the output. Both scenarios are referred to as lubrication action in the present disclosure. In other words, a lubrication action may comprise dispensing of lubricant and may comprise a lubrication attempt, during which the electric motor is actuated, but no lubricant can be dispensed, e.g. because of an output blockage, because the lubricant container is empty, because of a malfunction of the container, because of an erroneous coupling of the container to the lubricator, because no lubricant container is coupled to the lubricator or the like. Further, the "at least part" of the lubrication action may refer to a partial or the entire time period of the lubrication action (and/or lubrication time period).

The control circuitry may refer to a control circuit, a controller and/or a control unit configured to actuate and/or control the electric motor. The control circuitry may be coupled to the electric motor by one or more electric lines. The control circuitry may be configured to switch-on the electric motor, e.g. thereby initiating the at least one lubrication action. For instance, the control circuitry may switch-on the electric motor by activating a power supply for supplying electrical power to the electric motor and/or by coupling the electric motor to the power supply, e.g. based on actuating a switch arranged in a supply line connecting the power supply and the electric motor. Further, the control circuitry may be configured to switch-off the electric motor, e.g. to terminate the at least one lubrication action and/or to measure and/or determine the BEMF, as will be described in more detail in the following. The electric motor may be switched-off by the control circuitry e.g. by deactivating the power supply and/or by decoupling the electric motor from the power supply.

Further, the lubricator can comprise a data storage and/or data storage device. The data storage may be part of and/or may be coupled to the control circuitry. The control circuitry may further comprise one or more processors, e.g. one or more microcontrollers or the like. The data storage may store software instructions and/or a computer program, which, when executed by the one or more processors of the control circuitry instructs the lubricator to perform the functional features and/or functionalities described above and in the following with reference to the lubricator, such as e.g. the determination of the BEMF and the determination of the at least one lubrication parameter.

The back electromotive force (or BEMF) is also referred to as counter electromotive force (or CEMF). Generally, the BEMF may refer to, be indicative of, representative of, descriptive of and/or correlate with a voltage generated by the electric motor during rotation of the electric motor and/or generated by a relative motion of an armature of the electric motor and a magnetic field generated by one or more windings (and/or coils) of the electric motor. In other words, the BEMF can be indicative of a voltage generated in one or more windings of the electric motor by rotation of an armature (and/or a rotor) of the electric motor, e.g. during at least a part of the lubrication action. Accordingly, the BEMF can be regarded a result of the (spinning) electric motor acting as a generator for generating electrical power. Further, the BEMF may be given in units of volts and/or may be referred to as BEMF voltage in the context of the present disclosure.

In accordance with Lenz's law, the BEMF (or BEMF voltage) opposes a supply voltage supplied to the electric motor to drive the electric motor. Therein, the supply voltage may be proportional to, correlate with and/or be equal to the sum of a voltage drop on a resistance of one or more windings of the electric motor, which is induced in the one or more windings by the supply current and/or the supply voltage supplied by the power supply, and the BEMF, e.g. while the electric motor is spinning. The voltage drop on the resistance of the one or more windings may also be referred to as voltage drop across the one or more windings of the electric motor in the present disclosure. The BEMF can be regarded as a generator output and/or output voltage of the electric motor acting as generator. Hence, the BEMF is (directly) proportional to a rotational speed and/or angular velocity of the electric motor. The BEMF is zero Volts when the electric motor is started, e.g. at a lubrication start time. This may mean that the one or more windings of the electric motor receive the maximum supply voltage and the electric motor draws a maximum supply current, when it is switched-on, powered and/or driven, but the armature is not turning. As the electric motor's rotational speed increases, the BEMF increases, thereby reducing the amount of current drawn by the electric motor.

Accordingly, as the BEMF is (directly) proportional to the rotational speed of the electric motor, determining the BEMF can allow to precisely and reliably monitor an operation and/or rotation of the electric motor. In other words, determining the BEMF can allow to determine and/or derive information related to the operation of the electric motor, such as e.g. whether or not the electric motor is running (and/or spinning) and/or the rotational speed of the electric motor. Further, as the actual operation and/or rotation of the electric motor can be linked with an actual lubrication by means of the lubricator, with the container (e.g. a condition or operation of the container), with the operation of the lubricator and/or with the at least one lubrication action, the at least one lubrication parameter can be reliably, quickly and accurately determined based on the determination of the BEMF, as will be further discussed hereinbelow.

In the context of the present disclosure, the at least one lubrication parameter is indicative of, representative of and/or descriptive of the at least one lubrication action. Therein, the at least one lubrication parameter may, generally, refer to an operational parameter or parameter descriptive, representative, and/or indicative of an operation of the lubricator and/or an operation of at least a part of the lubricator, such as e.g. the electric motor. Alternatively or additionally, the at least one lubrication parameter may be descriptive, representative, and/or indicative of a status, a state, a condition and/or a working condition of the lubricator and/or at least a part thereof, such as e.g. an idle state, a running state, a normal working condition and/or an abnormal working condition. Alternatively or additionally, the at least one lubrication parameter may refer to an operational parameter descriptive, representative, and/or indicative of an operation of the container and/or an operation of at least a part of the container, such as e.g. a rotation of the rotatable shaft, a movement of the rotatable shaft, a displacement of the piston and/or a movement of the piston. Moreover, the at least one lubrication parameter may be indicative of, descriptive of and/or representative of a state, a status and/or a condition of the lubricant container, such as e.g. an amount of lubricant contained and/or remaining in the container. These aspects will be further elucidated hereinbelow.

The present disclosure may be considered as being at least partly based on the following insights and findings. Generally, it may be desirable to increase an efficiency and reliability of industrial systems, devices and/or apparatuses. For this purpose, it may be desirable to determine, detect and/or monitor one or more lubrication parameters by means of an automatic lubricator, which in turn may provide, for example, an indication about whether the object to be lubricated is indeed reliably and sufficiently lubricated. Accordingly, offering an enhanced functionality of a lubricator may be desirable in the field of industrial systems and/or in industry. For example, it can be beneficial to detect an abnormal work condition (or working condition), an error, a failure, and/or a malfunction of the lubricator and/or the container, which can allow for a fast reaction to re-establish proper or normal operation of the lubricator and/or the container as soon as possible, such that a possibility or risk of damaging the object to be lubricated, e.g. due to a lack of proper lubrication, can be minimized.

According to the present disclosure, one or more lubrication parameters can be determined and/or detected based on determining, detecting, measuring, and/or monitoring the BEMF, which may be regarded as a work parameter of the electric motor. In turn, this can allow for an efficient, fast, cost-efficient, reliable and/or accurate determination of the one or more lubrication parameters, in particular without requiring additional sensors for detecting the one or more lubrication parameters. Moreover, the functionality of the lubricator allowing to determine the BEMF and the at least one lubrication parameter can be built and/or integrated into the lubricator, e.g. into the housing of the lubricator. This can, for example, allow to use different types and/or sizes of containers with the same lubricator, particularly without requiring any modification to the container. In other words, as the functionality allowing to determine the BEMF and the lubrication parameter(s) may not be connected with the container itself, allowing to use the lubricator an arbitrary number of times, even when the lubricant container has been replaced and/or the container size has been changed. Also, maintenance efforts and costs, e.g. for replacing the containers, can be significantly reduced as no extra action, e.g. related to fixing a dedicated sensor to the lubricant container, may be required.

In other words, a reliable detection of the lubrication parameter(s) that is independent on environmental conditions, such as e.g. vibration, moisture and/or temperature at the site of the lubricator, can be ensured by the lubricator according to the present disclosure. Also, the cost of determining the lubrication parameter(s) as well as costs involved with replacement of the container can be minimized, since, for example, no additional time-consuming action like manual fixing of a dedicated sensor to the lubricant container may be required. Also, the invention can be used to advantage with different types of containers, independent on their dimensions and length.

According to an embodiment, the at least one lubrication parameter is indicative of at least one of an abnormal working condition of the lubricator, an abnormal working condition of the lubricant container, a blockage of the output and/or outlet of the lubricant container, an amount of lubricant dispensed during at least a part of the at least one lubrication action, an accumulated amount of lubricant dispensed from the lubricant container in a plurality of lubrication actions, an amount of lubricant remaining in the lubricant container, a force exerted by the electric motor onto the shaft during at least a part of the at least one lubrication action, a lubrication time period for the at least one lubrication action, a lubrication frequency, and a time (or time period) between consecutive lubrication actions. Accordingly, based on the determined BEMF one or more lubrication parameters providing information about the lubrication action and/or the condition of the lubricator and/or the condition of the container can be determined. Therein, one lubrication parameter can be derived from another lubrication parameter. For instance, the amount of lubricant dispensed during the at least one lubrication action actually performed can be determined and added to an amount of lubricant dispensed during one or more previous lubrication actions in order to determine the accumulated amount of lubricant. This can allow to derive comprehensive information about the lubrication action, the lubricator and/or the container based on determining and/or monitoring the BEMF.

Therein, the abnormal working condition of the container and/or the lubricator may refer to a working condition, in which an actual amount of lubricant dispensed during the lubrication action differs from a pre-defined and/or target amount of lubricant, e.g. an amount that should be dispensed during the lubrication action. This can comprise dispensing more lubricant as well as less lubricant than the pre-defined amount of lubricant. For instance, the output and/or outlet of the container may be completely or partially blocked resulting in a reduction of the actual amount of lubricant dispensed during the lubrication action.

Further, the blockage of the output determined based on the BEMF may refer to a partial blockage or a complete blockage of the output. The lubrication time period may refer to and/or denote the time period of the lubrication action, i.e. the time during which the electric motor actuated by the control circuitry, is switched-on, powered, driven and/or supplied with electric power by the control circuitry (and/or the power supply). The lubrication time period may be given as the time difference between a termination time of the lubrication action, at which the lubrication action is terminated, and a start time of the lubrication action, at which the lubrication action was started or initiated.

It should be noted that the present disclosure is not limited to the lubrication parameters listed above. Rather, any other lubrication parameter that is determinable based on the determined BEMF can alternatively or additionally be determined. For instance, a normal working condition, such as e.g. a condition in which the actual amount of lubricant dispensed matches the pre-defined and/or target amount, can be determined. Alternatively or additionally one or more of a start time of a subsequent lubrication action, a pressure exerted by the electric motor onto the shaft, a pressure exerted by the piston onto the lubricant, a force exerted by the piston onto the lubricant, a viscosity of the lubricant, and a torque exerted by the electric motor can be determined based on the determined BEMF.

According to an embodiment, the control circuitry is configured to determine the BEMF based on a measurement of a voltage generated in one or more windings of the electric motor by rotation of a rotor and/or armature of the electric motor (and/or a voltage drop across the resistance of the one or more windings). As described hereinabove, the BEMF is generated by the spinning motor and is indicative of and/or refers to the voltage generated in one or more windings of the electric motor by rotation of the armature of the electric motor, e.g. during at least a part of the lubrication action. Accordingly, the BEMF can be determined in a fast, reliable, accurate and cost-efficient manner based on measuring the voltage in the one or more windings and/or across the one or more windings.

According to an embodiment, the control circuitry is configured to switch-off the electric motor, wherein the control circuitry is configured to determine the BEMF in response to and/or upon switching-off the electric motor. Therein, the electric motor may be switched-off in order to terminate the lubrication action and/or in order to measure the BEMF during the lubrication action. It should be noted that the BEMF can be determined one or more times during the actual lubrication action and/or during the lubrication time period based on switching-off the electric motor for one or more short time intervals for determining and/or measuring the BEMF. The BEMF for the entire lubrication action may then be determined based on the BEMFs or BEMF values determined during the lubrication action.

It should be noted that although the electric motor may be switched-off one or more times for measuring the BEMF during the lubrication action, this time period is counted as being part of the actual lubrication action (or lubrication time period), because the measurement time for measuring the BEMF is one or more orders of magnitude smaller than the actual lubrication time period associated with the lubrication action. Accordingly, although the electric motor may be switched-off one or more times for measuring the BEMF during a lubrication action, this is regarded as continuously actuating the electric motor and/or supplying the electric motor with electrical power in the context of the present disclosure. Generally, due to inertia of the electric motor, when the power supply is stopped in normal conditions, e.g. when the motor was rotating and there was no blockage at the output of the container, the motor may rotate for some period of time and that means that the shaft may be rotating as well, the piston may be moving and the lubricant may still be dispensed. For that reason, the short period of time during which the motor may not be powered by the power supply but during which it may still rotate, may be included in lubrication time.

Further, in the context of the present disclosure, "in response to switching-off" may mean that switching-off the electric motor triggers determination and/or measurement of the BEMF. By way of example, the BEMF may be determined and/or measured while no circuit between the one or more windings and a source and/or sink of electrical energy is active. In order to precisely determine and/or measure the BEMF, the measurement is preferably carried out immediately after switching-off the electric motor, e.g. such that the rotational speed of the electric motor substantially matches the rotational speed before switching-off the electric motor. However, the BEMF can also be determined and/or measured with a certain time delay after switching-off the electric motor. Generally, when the electric motor is switched-off, the voltage drop across the resistance of the one or more windings of the electric motor, which may be induced by the supply voltage and/or the supply current, drops to zero, thereby allowing to precisely measure the BEMF.

According to an embodiment, the control circuitry is configured to determine the BEMF based on measuring a voltage across one or more windings of the electric motor. In other words, the BEMF can be determined based on directly measuring the voltage across the one or more windings upon switching-off the electric motor.

According to an embodiment, the lubricator further comprises a power supply for supplying electric power to the electric motor, wherein the control circuitry is configured to deactivate the power supply to switch-off the electric motor. Alternatively or additionally, the control circuitry is configured to disconnect the power supply from the electric motor to switch-off the electric motor. Accordingly, the control circuitry can be configured to actuate the power supply to switch-off the electric motor, e.g. by providing a control signal to the power supply. Alternatively or additionally, the control circuitry can disconnect and/or decouple the electric motor from the power supply, e.g. based on actuating a switch arranged in an electric supply line coupling the power supply and the electric motor, in order to switch-off the electric motor.

According to an embodiment, the lubricator further comprises a power supply for supplying electric power to the electric motor, wherein the control circuitry is configured to determine the BEMF based on determining a voltage drop and/or a voltage across one or more windings of the electric motor while the electric motor is supplied with electric power by the power supply. As the BEMF opposes the supply voltage driving the electric motor, the BEMF reduces the voltage drop on the resistance of the one or more windings, wherein the actual voltage in the windings and/or the voltage drop on the resistance of the windings determined while the electric motor is supplied with electric power correlates with the BEMF and allows for an accurate, fast and reliable determination thereof.

According to an embodiment, the control circuitry is configured to determine a supply voltage supplied by the power supply to the electric motor during at least a part of the lubrication action, wherein the control circuitry is configured to determine the BEMF based on the determined supply voltage and based on the determined voltage, the voltage drop across the one or more windings of the electric motor and/or the voltage drop on the resistance of the one or more windings. For instance, the control circuitry can determine the supply voltage and the voltage across the windings while the electric motor is powered. As the supply voltage is proportional to, correlates with and/or equals the sum of the BEMF and the voltage drop on the resistance of the one or more windings induced in the windings by the supply voltage and/or the supply current, the BEMF can be accurately and quickly determined.

The measured value of the supply voltage can be directly proportional to the supply current drawn from the power supply, as it may be the nominal voltage of the supply voltage minus the voltage drop on an internal resistance of the power supply (which can be known), wherein the supply current may be known based on the measured value of the supply voltage, and thus the voltage drop on the resistance of the windings may also be known (as the resistance of the windings may be known). Hence, the BEMF might be quickly determined.

According to an embodiment, the control circuitry is configured to determine the at least one lubrication parameter based on comparing the determined supply voltage with the determined voltage drop and/or voltage across the one or more windings of the electric motor (and/or the voltage drop on the resistance of the one or more windings). When the rotational speed of the electric motor decreases, also the BEMF decreases. As a result, a difference between the supply voltage and the voltage drop across the windings, which correlates with the BEMF, may be changed By way of example, if the output is blocked and the electric motor is not turning although supplied with electric power, the BEMF is zero Volts and the voltage drop across the windings and/or the voltage drop on the resistance of the one or more windings substantially matches the supply voltage. Accordingly, based on comparing the supply voltage and the voltage drop allows to determine the one or more lubrication parameters.

According to an embodiment, the control circuitry is configured to determine a supply current supplied to the electric motor during at least a part of the lubrication action, wherein the control circuitry is configured to determine the BEMF based on the determined supply current and based on the determined voltage drop across the one or more windings of the electric motor and/or the voltage drop on the resistance of the one or more windings. The control circuit may be configured to calculate the supply voltage based on the supply current and based on a value of a resistance of the one or more windings in order to determine the BEMF. In other words, the control circuitry can be configured to determine the BEMF based on the determined voltage drop across the one or more windings of the electric motor, based on the determined current supplied to the electric motor and based on a value of a resistance of the one or more windings of the electric motor.

Therein, the value of the resistance can be stored in a data storage of the lubricator and/or it can be retrieved from another source, e.g. remote from the lubricator. For instance, the value of the resistance may be retrieved via a communication circuitry and/or a communication interface of the lubricator, e.g. from a database or the like.

Alternatively or additionally, the value of the resistance can be determined by the control circuitry. For instance, the value of the resistance can be measured by the control circuitry, e.g. based on monitoring a peak motor current (or supply current) and voltage on the one or more windings immediately after connecting the power supply to the electric motor. Alternatively or additionally, the value of the resistance can be measured by the control circuitry based on monitoring the voltage on one or more windings after connecting the electric motor to a current source of known, fixed value of current. Therein, the value of current supplied by the current source may be small enough to prevent the electric motor from starting rotation. Alternatively, the value of the current supplied by the current source may be big enough to allow starting motor rotation and the voltage may be measured immediately after applying the current, but before the motor starts rotating.

According to an embodiment, the control circuitry further comprises a current sensor configured to determine the supply current supplied by the power supply to the electric motor during at least a part of the lubrication action. Accordingly, the control circuitry may measure the supply current using the current sensor. The supply voltage can then be calculated and/or computed based on the measured supply current and a value of the resistance of the one or more windings. Alternatively or additionally, the control circuitry can comprise a voltage sensor configured to determine a supply voltage supplied by the power supply to the electric motor.

According to an embodiment, the control circuitry is configured to determine the at least one lubrication parameter based on comparing the determined BEMF with at least one threshold value for the BEMF. One or more threshold values for the BEMF may be stored in a data storage of the lubricator and/or may be retrieved from another source, e.g. via a communication circuitry and/or communication interface of the lubricator. By way of example, a threshold value indicative of a blockage of the output of the container may be compared with the determined BEMF. If the determined BEMF reaches the threshold value, the control circuitry may determine the blockage of the output, i.e. the lubrication parameter. Likewise, any other lubrication parameter can be determined in this manner. Optionally, a control signal and/or warning signal may be triggered and/or generated by the control circuitry upon reaching and/or exceeding the at least one threshold value for the BEMF and/or a threshold value of any lubrication parameter determined based on the BEMF.

According to an embodiment, the control circuitry is further configured to compare the at least one lubrication parameter with at least one threshold value for the lubrication parameter. The at least one threshold value may e.g. be stored in the data storage. Alter natively or additionally, the at least one threshold value may be retrieved from another source, e.g. via a communication circuitry of the lubricator.

According to an embodiment, the control circuitry is configured to convert the determined BEMF into one or more lubrication parameters based on one or more conversion factors for the one or more lubrication parameters. The conversion factor(s) can be stored in a data storage of the lubricator and/or retrieved from another source, e.g. via a communication circuitry and/or communication interface of the lubricator. The determined BEMF can then directly or indirectly be converted into the one or more lubrication parameters by applying the corresponding conversion factor(s) to the determined BEMF.

According to an embodiment, the control circuitry is configured to determine, based on the determined BEMF, at least one of a rotational speed of the electric motor during at least a part of the lubrication action, a rotational speed of the rotatable shaft of the lubricant container during at least a part of the lubrication action, and a displacement of the piston along the shaft of the lubricant container during at least a part of the lubrication action. Based on one or more of these quantities, one or more lubrication parameters can be calculated and/or computed. Accordingly, the control circuitry can be configured to determine the at least one lubrication parameter based on at least one of the determined rotational speed of the electric motor, the rotational speed of the rotatable shaft, and the displacement of the piston.

According to an embodiment, the control circuitry is configured to determine the at least one lubrication parameter based on at least one container parameter, wherein the at least one container parameter is indicative of at least one of a type of the lubricant container, a capacity of the lubricant container, a volume of the lubricant container, an initial volume of lubricant stored in the lubricant container, a geometry of the lubricant container, a height of the lubricant container, and a diameter of at least a part of the lubricant container. By way of example, based on the at least one container parameter and based on a displacement of piston during the lubrication action as determined based on the BEMF, the amount dispensed during the lubrication action can be calculated. Further, taking into account an initial volume of lubricant in a container and the actual amount dispensed from said container during the lubrication action (or an accumulated amount of lubricant dispensed during a plurality of lubrication actions), the amount of lubricant remaining in the container after performing the lubrication action can be calculated. Also, a lifetime of the container may be determined e.g. based on the frequency of lubrication actions.

According to an embodiment, the at least one lubrication parameter is indicative of the amount of lubricant dispensed during the at least one lubrication action, wherein the control circuitry is configured to compare the determined amount of lubricant dispensed during the at least one lubrication action with a target and/or pre-defined amount of lubricant which should be dispensed during the at least one lubrication action. Generally, this allows to ensure that the object is reliably lubricated with the correct amount of lubricant as specified by the target amount.

According to an embodiment, the control circuitry is configured to terminate the at least one lubrication action when the determined amount of lubricant dispensed reaches or exceeds the target amount of lubricant. Accordingly, the control circuitry may monitor the BEMF during the lubrication action and e.g. compute the BEMF integrated over time during the lubrication action. Further, the BEMF and/or BEMF integrated over time may be converted into the amount of lubricant dispensed and compared to the target amount. Upon reaching the target amount, the lubrication action may be stopped, thereby ensuring proper lubrication of the object. It should be noted, however, that the BEMF may alternatively or additionally be compared to a target BEMF value representative of the target amount of lubricant. Optionally, a control signal and/or warning signal may be triggered and/or generated by the control circuitry upon reaching and/or exceeding the target amount of lubricant.

According to an embodiment, the control circuitry is configured to calculate, based on the determined BEMF, an amount of lubricant dispensed during the at least one lubrication action, wherein the control circuitry is further configured to determine an amount of lubricant remaining in the lubricant container based on the determined amount of lubricant dispensed during the at least one lubrication action. For instance, the determined amount of lubricant dispensed during the lubrication action may be subtracted from an initial amount of lubricant stored in the container and/or from an amount of lubricant stored in the container prior to performing the lubrication action in order to determine the remaining amount of lubricant.

According to an embodiment, the lubricator further comprises a communication circuitry configured to transmit a signal related to and/or indicative of the at least one lubrication parameter. The communication circuitry may be a wired communication circuitry or a wireless communication circuitry. By way of example, the signal may be a warning signal indicating a blockage of the output of the container. Alternatively or additionally, the signal may be indicative of the amount of lubricant dispensed during the lubrication action. Alternatively or additionally, the signal may be indicative of the amount of lubricant remaining in the container after the lubrication action. Optionally, such signal may be a warning signal indicating that the remaining lubricant has reached a threshold value. This may allow to indicate that the container should be replaced.

According to an embodiment, the control circuitry is further configured to compare the at least one lubrication parameter with at least one threshold value for the lubrication parameter, wherein the control circuitry is configured to trigger transmission of the signal via the communication circuitry, when the at least one lubrication parameter reaches or exceeds the at least one threshold value for the lubrication parameter.

By means of the communication circuitry, an enhanced functionality of the lubricator can be provided. For instance, this provides the possibility of setting one or more parameters of the lubricator and reading one or more sets of data without necessity of dismounting the lubricator from the lubrication site and even without coming too close to this site, as in many cases the automatic lubricators are placed in a places with difficult or dangerous access. In such situation the communication circuitry, particularly providing wireless connectivity to the lubricator, can be advantageous as it can allow to reduce the number of LEDS, displays, switches and buttons mounted on the hardware, and in such a way decrease the cost while improving readability of data exchanged with the lubricator. For instance, the lubricator and/or the communication circuitry can comply with at least one wireless communication standard, such as e.g. Bluetooth or Wi-Fi, so that it can be accessed with a user device like a smartphone or a laptop rather than with a dedicated hardware. Hence, the lubricator might be able to exchange data, signals and/or commands with an external device which only needs to be equipped with corresponding software. Also, this can allow to avoid additional cost connected with a dedicated device designed only for communication with the lubricator. Moreover, a wireless communication can allow for placing the lubricator in hard-to-reach destinations without necessity of providing cables to connect to the device and change settings or read the data regarding the operation of the lubricator.

The communication circuitry may be and/or comprise a radio module that can be embedded into the lubricator, e.g. so that it is protected by the housing against damage, dust and humidity. This can be of particular advantage in an environment with heavy machinery where the lubricators are normally placed.

Further, based on the communication circuitry, operation of the lubricator can be monitored, e.g. without necessity of visual inspection of the lubricator mounted on a machine. Based on the communication circuitry, a self-monitoring feature, which can e.g. verify the status of the lubricator, can be implemented. For instance, a notification, a warning, a signal, a warning signal and/or an alarm message can be transmitted via the communication circuitry and/or a corresponding communication interface that is preferably configured for wireless transmission. For instance, this can allow to recognize if the lubricator is working properly or not without visual inspection. Also, a signal regarding the status and/or the lubrication parameter can be received from the lubricator, e.g. on an external device.

The self-monitoring feature or functionality of the lubricator, which can be implemented in the control circuitry, can recognize a situation when an immediate action should be taken and e.g. send an alarm message. Optionally, a failure, e.g. by assessing that the level of the lubricant in the container is coming close to empty and/or that battery level is close to discharge, can be predicted and a warning message can be sent before the actual failure occurs. This allows a service action to be planned in advance after the warning has been received.

According to an exemplary embodiment, the control circuitry is further configured to determine, estimate, compute and/or calculate a date, time, time instant and/or time period for a next service action for servicing the lubricator or at least a part thereof. The date, time, time instant and/or time period can for example be calculated based on monitoring one or more parameters, such as e.g. an amount of lubricant in the lubricant container, and the like. Alternatively or additionally, data and/or information related to one or more lubrication actions performed by the lubricator in the past and/or scheduled in future can be taken into account. For example, it can be determined how often or frequently lubricant is dispensed, how much lubricant is dispensed in each lubrication. This can allow to estimate and/or determine a remaining working time until a next service action, e.g. for a change of the lubricant container, should be carried out. Further, based on such information, the date, time, time instant and/or time period for the next service action can be determined and/or calculated. Therein, determining the date, time, time instant and/or time period may comprise determining a maintenance date for servicing the lubricator. Further, the determined date, time, time instant, time period and/or maintenance date may be transmitted via the communication circuitry, i.e. over wired or wireless communication interface, to another device which can communicate with the lubricator, such as e.g. a gateway, a laptop, a smartphone or any other device.

Generally, this can allow to reduce the number of maintenance actions as the exact date and/or time of the next maintenance action can be determined. Prediction of dates when the service should be carried out may further allow to minimize the number of unnecessary maintenance actions and to plan the work of the service team in advance.

A second aspect of the present disclosure relates the use of the lubricator, as described above and in the following, for lubricating an object.

A third aspect of the present disclosure relates to a lubrication system for lubricating an object. The lubrication system comprises a lubricant container configured to contain and/or containing a lubricant and comprising a rotatable shaft with a piston to dispense the lubricant from an output of the lubricant container. The lubrication system further comprises a lubricator that includes a housing with a coupling section coupled to the lubricant container, an electric motor configured to drive the rotatable shaft of the lubricant container during at least one lubrication action, such that at least a part of the lubricant is dispensable from the lubricant container during the at least one lubrication action, and a control circuitry for controlling the electric motor. Therein, the control circuitry is configured to determine a back electromotive force, BEMF, generated by the electric motor during at least a part of the at least one lubrication action, and determine, based on the determined BEMF, at least one lubrication parameter indicative of the at least one lubrication action.

A fourth aspect of the present disclosure relates to method of lubricating an object, the method comprises:
actuating, with a control circuitry of an automatic lubricator, an electric motor of the lubricator during at least one lubrication action, to drive a rotatable shaft of a lubricant container and to displace a piston coupled to the rotatable shaft;
determining a back electromotive force, BEMF, generated by the electric motor during at least a part of the at least one lubrication action; and
determining, based on the determined BEMF, at least one lubrication parameter indicative of the at least one lubrication action.

A fifth aspect of the present disclosure relates to a computer program, which, when executed by one or more processors of a lubricator, instructs the lubricator to carry out the steps of the method, as described above and in the following.

A sixth aspect of the present disclosure relates to a non-transitory computer-readable medium storing a computer program, which, when executed by one or more processors of a lubricator, instructs the lubricator to carry out the steps of the method, as described above and in the following.

It should be noted that any feature, element, step and/or function described above and in the following with reference to one aspect of the present disclosure equally applies to any other aspect of the present disclosure. Specifically, any feature, element, step, and/or function described above and in the following with respect to the lubricator equally applies to the lubrication system and/or the method, and vice versa.

Further, it should be noted that any embodiment described hereinabove with reference to one aspect of the present disclosure can be combined with any other embodiment of the same or any other aspect. This may mean that any dependent claim can depend from any of the preceding claims.

These and other aspects of the invention will be apparent from and elucidated with reference to the embodiments described hereinafter.

BRIEF DESCRIPTION OF THE DRAWINGS

In the following, the invention is described with reference to the appended figures which give background explanations and represent exemplary embodiments of the invention.

The figures are schematic only and not true to scale. In principle, identical or like parts, elements and/or steps are provided with identical or like reference symbols in the figures.

DETAILED DESCRIPTION OF EXEMPLARY EMBODIMENTS

Figure 1:
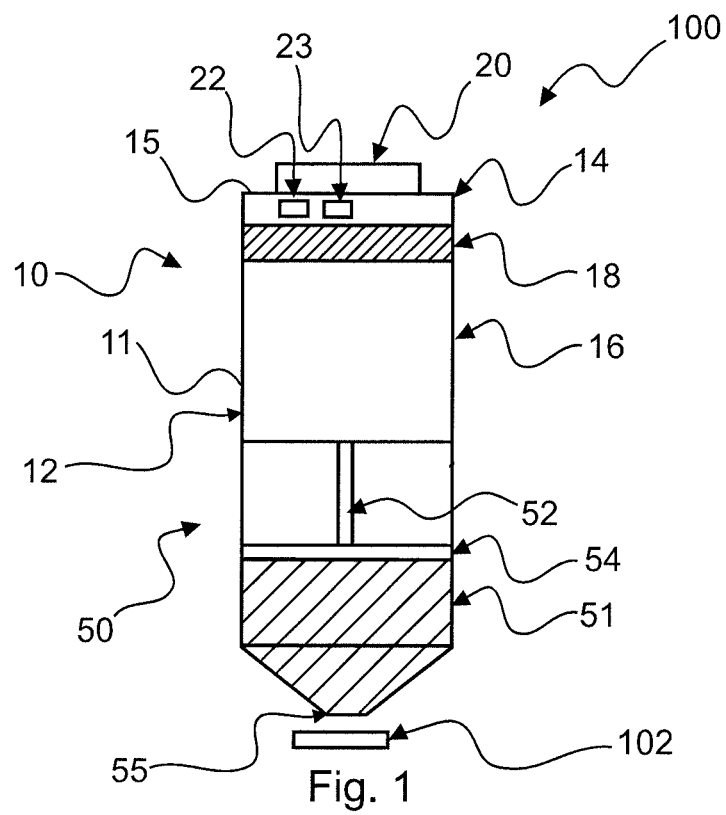
FIG. 1 shows a cross-sectional view of a lubrication system according to an exemplary embodiment.

FIG. 1 shows a cross-sectional view of a lubrication system 100 according to an exemplary embodiment.

The lubrication system 100 comprises a lubricator 10 with a housing 11 having a coupling section 12 which is coupled to a lubricant container 50 of the lubrication system 100. The container 50 can be detachably attached to the lubricator 10 and/or the housing 11 by any suitable connection, such as e.g. a threaded coupling and/or threaded connection.

The lubricant container 50 comprises a rotatable shaft 52 and/or rotatable screw 52, on which a piston 54 is displaceably arranged, mounted and/or attached. Further, the container 50 contains a lubricant 51 which is to be dispensed via an outlet 55 and/or output 55 of the container 50 during a lubrication action. Upon rotation of the rotatable shaft 52, the piston 54 is displaced in a direction towards the output 55, such that a part of the lubricant 51 is pushed out of the output 55.

For driving the rotatable shaft 54 of the container 50, the lubricator 10 comprises an electric motor 16 and a control circuitry 14 for controlling and/or actuating the electric motor 16. The control circuitry 14 can be arranged at least partly on a Printed Circuit Board 15, PCB, arranged on a top side of the lubricator 10 opposite to the coupling section 12, the container 50 and/or the output 55. The PCB, however, can be arranged anywhere else. Optionally, the lubricator 10 may comprise a gearbox (not shown) which may be configured to change a rotational speed of the electric motor 11. For instance, based on the gearbox, the electric motor 11 can be operated at a low speed with higher force and at a high speed with low force.

The control circuitry 14 is further coupled to a power supply 18 which provides the electrical power for driving the electric motor 16, the rotatable shaft 52 and/or the piston 54. The power supply 18 can comprise one or more batteries. Alternatively or additionally, the power supply 18 may be connected to a supply grid and/or a power supply system.

The control circuitry 14 is configured to dispense a certain amount of lubricant 51 during a lubrication action onto and/or into an object 102 that is to be lubricated, such as e.g. a part, portion and/or member of an industrial system, an apparatus and/or device. For instance, the object 102 may be a bearing 102. Therein, the lubrication action may refer to and/or be indicative of a time period, during which the electric motor 16 is actuated and/or supplied with electrical power from the power supply 18, as discussed in detail in the aforegoing summary part. Accordingly, the lubrication action may refer to and/or be indicative of a time period, during which the electric motor 16 is actuated and/or supplied with electrical power from the power supply 18, and during which the amount of lubricant 51 dispensed via container output 55 is monitored based on determining the BEMF (and/or one or more lubrication parameter), as discussed in detail in the aforegoing summary part.

Further, the control circuitry 14 is configured to determine a back electromotive force, BEMF, generated by the electric motor 16 during at least a part of the lubrication action, and to determine, based on the determined BEMF, at least one lubrication parameter indicative of the lubrication action. Generally, the lubrication parameter can be one or more of an abnormal working condition of the lubricator 10, an abnormal working condition of the lubricant container 50, a blockage of the output 55 of the lubricant container 50, an amount of lubricant 51 dispensed during at least a part of the lubrication action, an accumulated amount of lubricant 51 dispensed from the lubricant container 50 in a plurality of lubrication actions, an amount of lubricant 51 remaining in the lubricant container 50, a force exerted by the electric motor 16 onto the rotatable shaft 52 of the container 50 during at least a part of the lubrication action, a lubrication time period for the lubrication action, a lubrication frequency, and a time between consecutive lubrication actions. Also other lubrication parameters can be determined, such as e.g. a normal working condition of the lubricator 10 and/or a start time for a subsequent lubrication action, as discussed in detail in the aforegoing summary part.

Generally, the BEMF can be measured directly by measuring the voltage across one or more windings of the electric motor 16, as described in detail with reference to FIG. 2. Alternatively or additionally, the BEMF can be calculated, as described in detail with reference to FIG. 3.

Further, the control circuitry 14 can comprise and/or be coupled with a data storage 23, in which one or more threshold values for the BEMF and/or for one or more lubrication parameters are stored. The one or more threshold values can alternatively or additionally be retrieved and/or accessed by the control circuitry 14 via a communication circuitry 22 of the lubricator 10. The control circuitry 14 can be configured to compare the BEMF determined during the lubrication action with the one or more threshold values to determine the one or more lubrication parameters.

Further, one or more conversion factors can be stored in the data storage 23, based on which the determined BEMF can be converted into one or more lubrication parameters. The one or more conversion factors can alternatively or additionally be retrieved and/or accessed by the control circuitry 14 via a communication circuitry 22 of the lubricator 10.

Moreover, the control circuitry 14 can compute one or more of the lubrication parameters based on the determined BEMF and based on at least one container parameter which may be descriptive of at least one of a type of the lubricant container 50, a capacity of the lubricant container 50, a volume of the lubricant container 50, an initial volume of lubricant stored in the lubricant container 50, a geometry of the lubricant container 50, a height of the lubricant container 50, and a diameter of at least a part of the lubricant container 50. Also the at least one container parameter can be stored in the data storage 23. Alternatively or additionally, it can be retrieved and/or accessed by the control circuitry 14 via a communication circuitry 22 of the lubricator 10.

Moreover, the control circuitry 14 can be configured to store data indicative of the BEMF and/or the at least one lubrication parameter determined during the lubrication action in the data storage 23. For instance, the control circuitry 14 may be configured to determine one BEMF or BEMF value for the entire lubrication action or it may be configured to determine a plurality of BEMF values during the lubrication action, e.g. in pre-defined and/or configurable time intervals.

In the following, some illustrative examples of determining one or more lubrication parameters are provided which should not be construed as limiting the present disclosure to these examples.

For instance, the lubrication parameter indicative of an output blockage can be determined based on the BEMF. The BEMF can be monitored and/or detected during the lubrication action. As the BEMF is proportional to the rotational speed of the electric motor 16 which drives the shaft 52, also a rotating speed of the shaft 52 driving the piston 54 and/or a displacement of the piston 54 during the lubrication action can be determined and/or computed based on the BEMF. Accordingly, based on the BEMF it can be determined whether the piston 54 was displaced during the lubrication and/or how much the piston 54 was moved. In turn this is related to the pressure with which the piston 54 pushes the lubricant 51 inside the container 50, and an excessive pressure can indicate an abnormal work condition such as a blocked output 55 of the container 50. This way, by determining the BEFM, it can be reliably detected when the output 55 of the lubricant container 50 is blocked.

As a blockage of the output 55, however, may result in reduced rotational speed of the motor 16 or even no rotation at all, the output blockage may alternatively or additionally be detected by the control circuitry 14 if the BEMF reaches a certain minimum value. Such detection of the output blockage can be advantageously discovered at the time it occurs. In turn, this can ensure proper lubrication of the object 102, while reducing maintenance efforts and costs. This stands in contrast with the detection of the blockage by visible inspection by an operator, as it is done in conventional lubrication systems.

In another illustrative example, the lubrication parameter of the amount of lubricant can be determined based on the EBMF. As described above, the BEMF is proportional to the rotating speed of the motor 16, and thus to the rotating speed of the shaft 52 driving the piston 54 and the piston displacement along the shaft 52 during the lubrication action. Accordingly, based on the determined BEMF, the amount of lubricant dispensed during the lubrication action can be determined. As, for example in case when the pressure inside the lubricant container 50 acts against the piston displacement, the rotation speed of the shaft 52 may be reduced, which may be detectable in changes of the determined BEMF, e.g. with respect to a reference value. This way, by determining the BEFM, it can be ensured that the motor 16 is driven for a sufficient time period to dispense a proper amount of lubricant from the container 50, which cannot be achieved with a fixed lubrication time period.

To achieve this, the amount of lubricant dispensed during the lubrication action can be determined based on the BEMF and compared to a target amount of lubricant which should be dispensed. The lubrication action may then be extended until the amount of lubricant determined based on the BEMF reaches and/or exceeds the target amount of lubricant. Again, this can ensure proper lubrication of the object 102, while reducing maintenance efforts and costs.

In another illustrative example, the lubrication parameter of the amount of lubricant remaining in the lubricant container 50 can be determined based on the BEMF. As described above, based on the BEMF, the amount of lubricant dispensed during a single lubrication action can be determined. Further, taking into account an initial amount of lubricant stored in the container, it can be computed how much of the lubricant is left in the container 50 after the lubrication action. Accordingly, based on the BEMF, it can be detected and/or predicted when the lubricant container 50 is empty.

For instance, a signal and/or warning signal can be triggered by the control circuitry 14 and transmitted via the communication circuitry 22 when the remaining amount of lubricant reaches a certain threshold value. Again, this can ensure proper lubrication of the object 102, while reducing maintenance efforts and costs.

In contrast thereto, in conventional lubricators, usually an operator assesses how much of the lubricant 51 is left in the container 50 based on a visual inspection of the level of lubricant 51 in the container. Other approaches may be based on using dedicated sensors for measuring the level of the lubricant or estimate the level of lubricant based on a total working time of the lubricator and assuming that during each lubrication action the pre-defined amount of lubricant has been dispensed. All these conventional approaches are error prone and require maintenance effort and costs or are even accompanied with additional costs for the lubricator. All these drawbacks are overcome with the lubricator according to the present disclosure.

The communication circuitry 22 of the lubricator can be a wired communication circuitry or a wireless communication circuitry. The communication circuitry 22 can be integrated into the housing 11. Therein, the communication circuitry 22 can comprise a corresponding communication interface. Via the communication circuitry 22, a signal indicative of the at least one lubrication parameter can be transmitted. For instance, a signal or warning signal can be transmitted if a blockage of the output 55 has been detected and/or if it has been detected that the level of lubricant 51 in the container 50 has reached a certain threshold value.

The control circuitry 14 can provide a self-monitoring functionality, e.g. allowing to recognize a situation when an immediate action should be taken. Further, upon detection of such situation an alarm message and/or signal can be transmitted via the communication circuitry. Also, in case when the status of the lubricator 10 and/or the container 50 changes slowly and it is expected that it might be heading into a problematic situation, the lubricator 10 can predict a failure, such as e.g. assessing that the level of the lubricant in the container 50 is coming close to empty and/or that the battery level is close to discharge, and send a warning message before the actual failure occurs and bring it to the attention of an operator. This allows to plan a service action in advance after the warning has been received.

Due to the fact that the lubricators 10 are often placed in location with difficult access and it is not always possible to provide wires to them, the communication circuitry 22 used for transmission of the signal, warning signal and/or alarm message preferably is a wireless communication circuitry 22 (although not necessarily).

Also any other information, data and/or signals can be transmitted and/or received via the communication circuitry 22. For instance, such information, data and/or signals can relate to at least one parameter characterizing the power supply, at least one parameter characterizing the lubricator and/or at least one parameter characterizing the object 102 and/or a machine on which the lubrication system 100 is mounted.

For example, the communication circuitry 22 can comprise a radio communication module, preferably enabling transmission over one or more wireless protocols, such as e.g. Bluetooth or Wi-Fi. This allows accessing the lubricator 10 with an external device like a smartphone or a laptop, or other external devices. Also, the communication circuitry 22 can communicate, for example, with a main MCU over HCl or UART interface, or it might be an MCU with integrated radio communication.

The lubricator further comprises an indicator 20 and/or display 20 configured to display at least one information item related to the at least one lubrication parameter.

Figure 2:
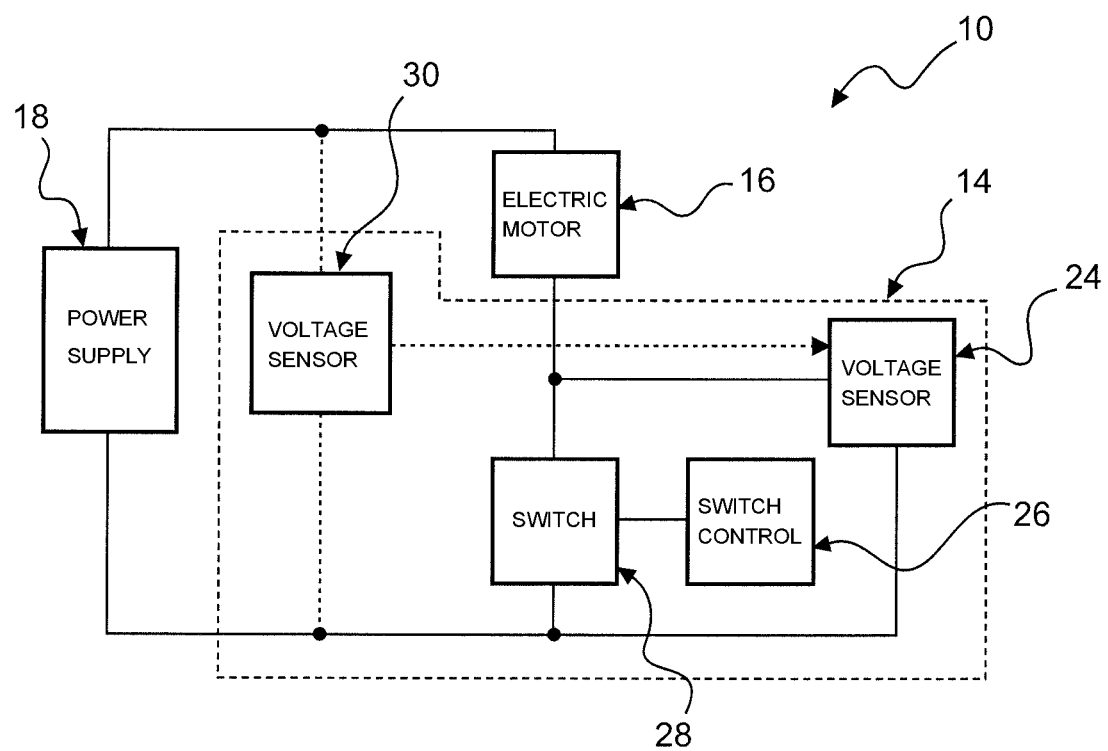
FIG. 2 shows a block diagram of a lubricator according to an exemplary embodiment.

FIG. 2 shows a block diagram of a lubricator 10 according to an exemplary embodiment. If not stated otherwise, the lubricator 10 of FIG. 2 comprises the same features, functions and/or elements as the lubricator 10 described with reference to FIG. 1. Specifically, a block diagram of the control circuitry 14, the electric motor 16 and the power supply 18 is illustrated in FIG. 2.

In the example illustrated in FIG. 2, the BEMF is directly measured by the control circuitry 14. As described in detail in the summary part, when the electric motor 16 is powered and/or supplied with electrical power, i.e. a supply voltage and a supply current, by the power supply 18, a voltage drop across one or more windings and/or a voltage drop on a resistance of the one or more windings occurs in the electric motor 16. When the electric motor 16 rotates and/or turns the BEMF or BEMF voltage is generated which opposes the supply voltage. The faster the motor 16 turns, the higher is the BEMF, which results in less supply current being drawn from the power supply 18. Accordingly, during rotation of the electric motor 18, the supply voltage correlates with the sum of the BEMF and the voltage drop across the one or more windings and/or the voltage drop on the resistance of the one or more windings induced by the supply current in the one or more windings.

To measure the BEMF directly on the one or more windings, the control circuitry 14 comprises a switch control 26 and a switch 28, such as e.g. a semiconductor switch, a transistor or the like. The switch 28 can be actuated by the switch control 26 to switch the electric motor 16 on and off. Upon switching-off the electric motor 16 by actuating the switch 28, the power supply 18 is decoupled from the electric motor 16 and the voltage drop on the resistance of the one or more windings induced by the supply current drops to zero. Due to inertia, however, the electric motor 16 keeps spinning and the voltage or voltage drop across the one or more windings substantially equals the BEMF.

To finally measure the BEMF, the control circuitry 14 comprises a voltage sensor 24 for determining and/or measuring the voltage across the one or more windings. To determine the BEMF with high precision, the BEMF and/or the voltage across the one or more windings is preferably measured with the voltage sensor immediately after switching-off the electric motor 16, and optionally after the voltage drop on the resistance of the one or more windings has dropped to zero.

Further, after the BEMF has been measured, the switch 28 can be actuated again to switch on the electric motor 16, e.g. while the electric motor 16 is still spinning. This allows to determine the BEMF one or multiple times during a lubrication action, without interrupting the rotation of the electric motor 16. It should be noted that although the power supply 18 may be decoupled from the electric motor 16 during the measurement of the BEMF, this time period is counted as being part of the actual lubrication action, because the measurement time for measuring the BEMF is one or more orders of magnitude smaller than the actual lubrication time period associated with the lubrication action. Accordingly, although the electric motor 16 may be switched-off one or more times for measuring the BEMF during a lubrication action, this can be regarded as continuously actuating the electric motor and/or supplying the electric motor 16 with electrical power in the context of the present disclosure.

Optionally, the control circuitry 14 may comprise a further voltage sensor 30 configured to detect, monitor and/or determine the supply voltage during the lubrication action. Information about the supply voltage can optionally be used for determining the BEMF and/or for determining one or more lubrication parameters.

Figure 3:
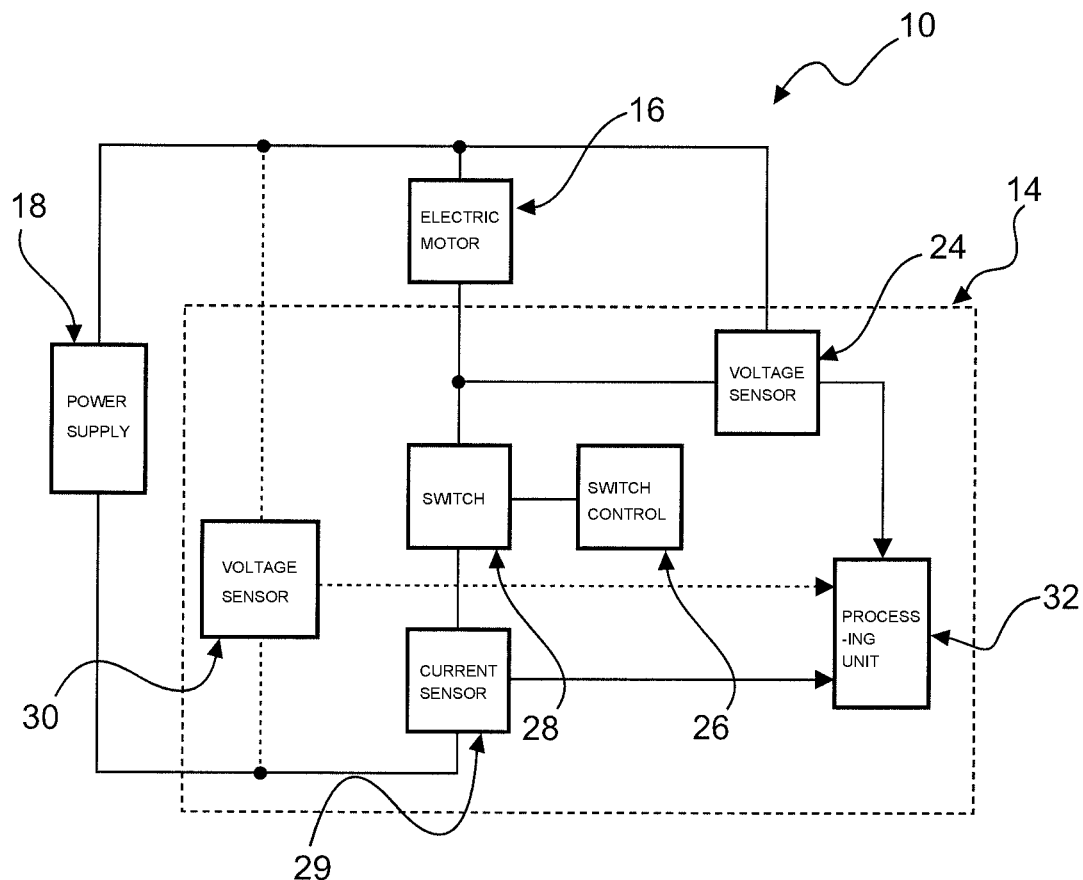
FIG. 3 shows a block diagram of a lubricator according to an exemplary embodiment.

FIG. 3 shows a block diagram of a lubricator 10 according to an exemplary embodiment. If not stated otherwise, the lubricator 10 of FIG. 3 comprises the same features, functions and/or elements as the lubricator 10 described with reference to FIGS. 1 and 2. Specifically, a block diagram of the control circuitry 14, the electric motor 16 and the power supply 18 is illustrated in FIG. 3.

In the example illustrated in FIG. 3, the BEMF is computed and/or calculated based on determining, detecting and/or monitoring the supply current supplied by the power supply 18 to the electric motor 16 with a current sensor 29 of the control circuitry 14. The supply current can also be referred to as motor current. The control circuitry 14 comprises at least one processing unit 32 and/or at least one processor 32 configured to calculate the supply voltage based on the sensed supply current and a value of a resistance of the electric motor 16 and/or one or more windings thereof. The value of the resistance can e.g. be stored in the data storage 23. Alternatively or additionally it can be retrieved and/or accessed via the communication circuitry 22.

During the lubrication action, i.e. while the electric motor 16 is switched on, the voltage and/or voltage drop on the resistance of the one or more windings of the electric motor 16 is determined by means of the voltage sensor 24. Knowing the voltage across the one or more windings and the supply voltage, the BEMF can be computed based on subtracting the determined voltage drop on the resistance of the one or more windings from the supply voltage.

Figure 4:
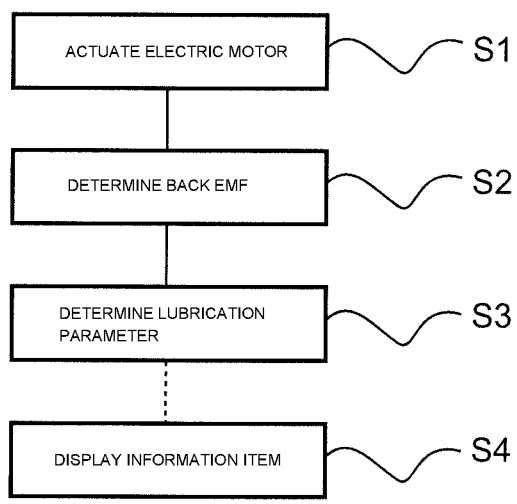
FIG. 4. Shows a flowchart illustrating steps of a method of lubricating an object according to an exemplary embodiment.

FIG. 4 shows a flowchart illustrating steps of a method of lubricating an object according to an exemplary embodiment. The method may likewise refer to a method of operating a lubricator 10 and/or a lubrication system 100 as described with reference to any of the aforegoing figures.

In step S1, the electric motor 16 of the lubricator 10 is actuated and/or switched-on with the control circuitry 14, in order to drive the rotatable shaft 52 of the lubricant container 50 and displace the piston 54 coupled to the rotatable shaft 52.

In step S2, the back electromotive force, BEMF, generated by the electric motor 16 during at least a part of the lubrication action is determined. Step S2 may comprise measuring the BEMF, e.g. as described with reference to FIG. 2, and/or computing the BEMF, e.g. as described with reference to FIG. 3.

In step S3, based on the determined BEMF, at least one lubrication parameter indicative of the at least one lubrication action is determined by the control circuitry 14.

In an optional step S4, an information item related to the at least one lubrication action is displayed on the indicator 20 of the lubricator 10. Alternatively or additionally, a signal indicative of the at least one lubrication parameter is transmitted via the communication circuitry 22 of the lubricator 10.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. An automatic lubricator for lubricating an object, the lubricator comprising:
 a housing with a coupling section configured to couple with a lubricant container containing a lubricant, wherein the lubricant container comprises a rotatable shaft with a piston to dispense the lubricant from an output of the lubricant container;
 an electric motor configured to drive the rotatable shaft of the lubricant container such that at least a part of the lubricant is dispensable from the lubricant container; and
 a control circuitry for controlling the electric motor, wherein the control circuitry is configured to:
  determine a back electromotive force (BEMF) generated by the electric motor when at least one of the electric motor is switched off and the electric motor is coasting; and
  determine, based on the determined BEMF, at least one lubrication parameter for at least one lubrication action of the automatic lubricator.

2. The lubricator according to claim 1, wherein the at least one lubrication parameter is indicative of at least one of:
 an abnormal working condition of the lubricator;
 an abnormal working condition of the lubricant container;
 an amount of lubricant dispensed during at least a part of the at least one lubrication action;
 an accumulated amount of lubricant dispensed from the lubricant container in a plurality of lubrication actions;
 an amount of lubricant remaining in the lubricant container;
 a force exerted by the electric motor onto the rotatable shaft of the container during at least a part of the at least one lubrication action;
 a lubrication time period for the at least one lubrication action;
 a lubrication frequency; and
 a time between consecutive lubrication actions.

3. The lubricator according to claim 1, wherein the control circuitry is further configured to determine the BEMF based on a measurement of a voltage generated in one or more windings of the electric motor by rotation of a rotor of the electric motor.

4. The lubricator according to claim 1, wherein the control circuitry is further configured to switch-off the electric motor, and determine the BEMF in response to switching-off the electric motor.

5. The lubricator according to claim 1, wherein the control circuitry is further configured to determine the BEMF based on a voltage across one or more windings of the electric motor, in response to switching-off the electric motor.

6. The lubricator according to claim 4, further comprising a power supply for supplying electric power to the electric motor, wherein the control circuitry is further configured to deactivate the power supply to switch-off the electric motor.

7. The lubricator according to claim 4, further comprising a power supply for supplying electric power to the electric motor, wherein the control circuitry is further configured to disconnect the power supply from the electric motor to switch-off the electric motor.

8. The lubricator according to claim 1, further comprising a power supply for supplying electric power to the electric motor, wherein the control circuitry is further configured to determine the BEMF based on determining a voltage drop across one or more windings of the electric motor while the electric motor is supplied with electric power by the power supply.

9. The lubricator according to claim 8, wherein the control circuitry is further configured to determine a supply voltage supplied by the power supply to the electric motor during at least a part of the lubrication action, and wherein the control circuitry further is configured to determine the BEMF based on the determined supply voltage and based on the determined voltage drop across the one or more windings of the electric motor.

10. The lubricator according to claim 9, wherein the control circuitry is further configured to determine the at least one lubrication parameter based on comparing the determined supply voltage with the determined voltage drop across the one or more windings of the electric motor.

11. The lubricator according to claim 8, wherein the control circuitry is further configured to determine a supply current supplied to the electric motor during at least a part of the lubrication action, and determine the BEMF based on the determined supply current and the determined voltage drop across the one or more windings of the electric motor.

12. The lubricator according to claim 11, wherein the control circuitry is further configured to determine the BEMF based on the determined voltage drop, the determined supply current, and a value of a resistance of the one or more windings of the electric motor.

13. The lubricator according to claim 1, wherein the control circuitry is further configured to determine the at least one lubrication parameter by comparing the determined BEMF with at least one threshold value for the BEMF.

14. The lubricator according to claim 1, wherein the control circuitry is further configured to determine, based on the determined BEMF, at least one of
a rotational speed of the electric motor during at least a part of the lubrication action,
a rotational speed of the rotatable shaft of the lubricant container during at least a part of the lubrication action, and
a displacement of the piston along the shaft of the lubricant container during at least a part of the lubrication action.

15. The lubricator according to claim 14, wherein the control circuitry is further configured to determine the at least one lubrication parameter based on at least one of
the rotational speed of the electric motor,
the rotational speed of the rotatable shaft, and
the displacement of the piston.

16. The lubricator according to claim 15, wherein the control circuitry is further configured to determine the at least one lubrication parameter based on at least one container parameter, wherein the at least one container parameter is indicative of at least one of:
a type of the lubricant container;
a capacity of the lubricant container;
a volume of the lubricant container;
an initial volume of lubricant stored in the lubricant container;
a geometry of the lubricant container;
a height of the lubricant container; and
a diameter of at least a part of the lubricant container.

17. The lubricator according to claim 14, wherein the at least one lubrication parameter is indicative of an amount of lubricant dispensed during the at least one lubrication action, and the control circuitry is further configured to compare the determined amount of lubricant dispensed during the at least one lubrication action with a target amount of lubricant to be dispensed during the at least one lubrication action.

18. The lubricator according to claim 17, wherein the control circuitry is further configured to terminate the at least one lubrication action, in response to the determined amount of lubricant dispensed reaching or exceeding the target amount of lubricant.

19. The lubricator according to claim 1, wherein the control circuitry is further configured to calculate, based on the determined BEMF, an amount of lubricant dispensed during the at least one lubrication action, and determine an amount of lubricant remaining in the lubricant container based on the determined amount of lubricant dispensed during the at least one lubrication action.

20. The lubricator according to claim 1, further comprising a communication circuitry configured to transmit a signal related to the at least one lubrication parameter.

21. The lubricator according to claim 20, wherein the control circuitry is further configured to trigger transmission of the signal via the communication circuitry, in response to the at least one lubrication parameter reaching or exceeding at least one threshold value for the at least one lubrication parameter.

22. A lubrication system for lubricating an object, the lubrication system comprising:
a lubricant container configured to contain a lubricant and comprising a rotatable shaft with a piston to dispense the lubricant from an output of the lubricant container;
a housing with a coupling section coupled to the lubricant container;
an electric motor configured to drive the rotatable shaft of the lubricant container such that at least a part of the lubricant is dispensable from the lubricant container; and
a control circuitry for controlling the electric motor, wherein the control circuitry is configured to:
determine a back electromotive force (BEMF) generated by the electric motor when at least one of the electric motor is switched off and the electric motor is coasting; and
determine, based on the determined BEMF, at least one lubrication parameter for at least one lubrication action of the lubrication system.

23. A method of lubricating an object, the method comprising:
actuating, with a control circuitry of an automatic lubricator, an electric motor of the lubricator to drive a rotatable shaft of a lubricant container and displace a piston coupled to the rotatable shaft;

determining a back electromotive force (BEMF) generated by the electric motor when at least one of the electric motor is switched off and the electric motor is coasting; and determining, based on the determined BEMF, at least one lubrication parameter for at least one lubrication action of the automatic lubricator.

24. A non-transitory computer-readable medium storing a computer program, which, when executed by one or more processors, instructs the lubricator to carry out the steps of the method according to claim 23.

25. An automatic lubricator for lubricating an object, the lubricator comprising:

a housing with a coupling section configured to couple with a lubricant container containing a lubricant, wherein the lubricant container comprises a rotatable shaft with a piston to dispense the lubricant from an output of the lubricant container;

an electric motor configured to drive the rotatable shaft of the lubricant container during at least one lubrication action such that at least a part of the lubricant is dispensable from the lubricant container during the at least one lubrication action; and a control circuitry for controlling the electric motor, wherein the control circuitry is configured to:

switch-off the electric motor;

determine a back electromotive force (BEMF) generated by the electric motor during at least a part of the at least one lubrication action, in response to the switching-off of the electric motor; and determine, based on the determined BEMF, at least one lubrication parameter indicative of the at least one lubrication action.

\* \* \* \* \*